April 4, 1961
H. E. CLUFF ET AL
2,978,265
QUICK DISCONNECT COUPLING
Filed July 30, 1959
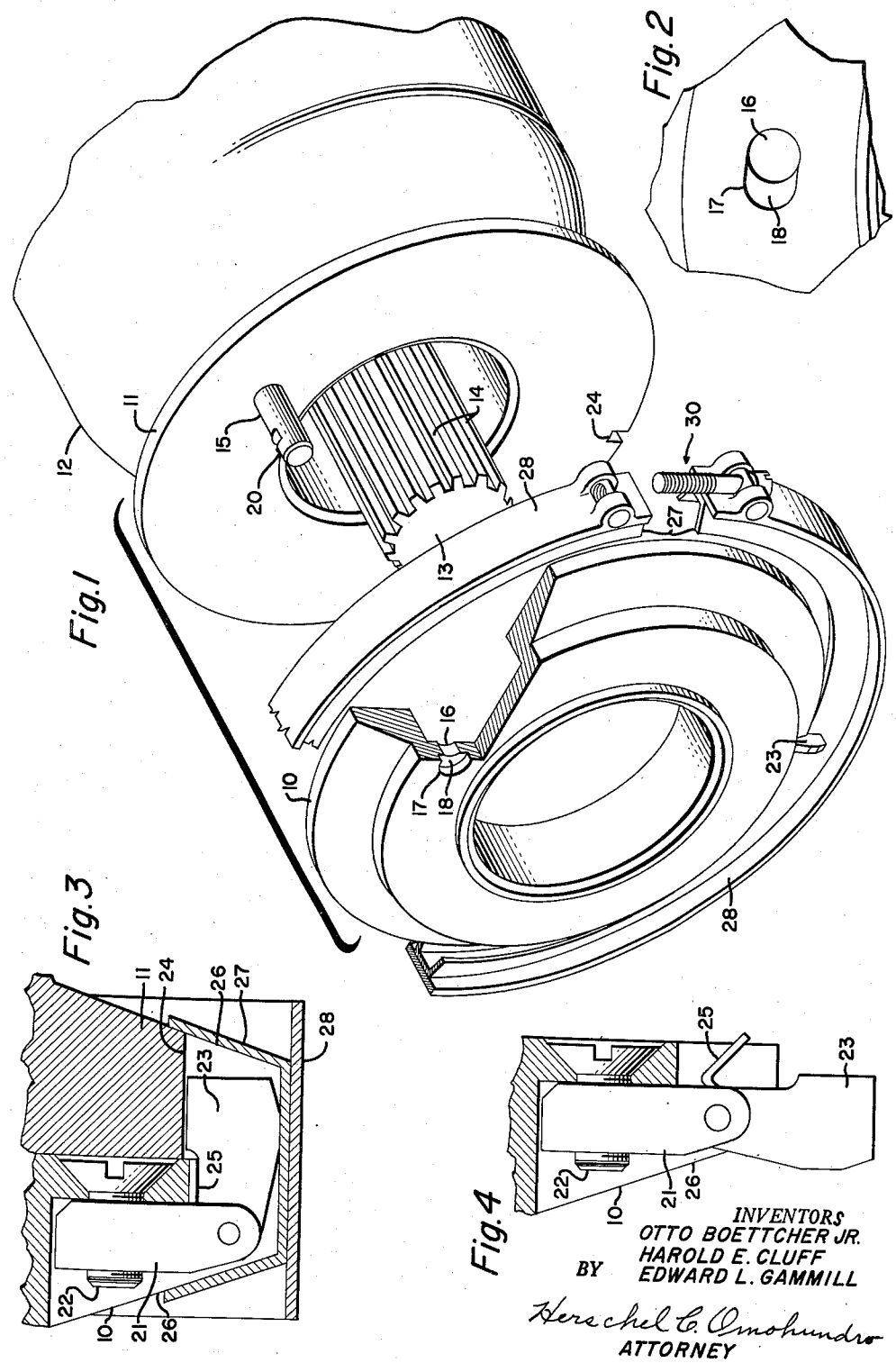
INVENTORS
OTTO BOETTCHER JR.
HAROLD E. CLUFF
EDWARD L. GAMMILL
BY
Herschel C. Omohundro
ATTORNEY

United States Patent Office 2,978,265
Patented Apr. 4, 1961

2,978,265

QUICK DISCONNECT COUPLING

Harold E. Cluff, Phoenix, Otto Boettcher, Jr., Scottsdale, and Edward L. Gammill, Phoenix, Ariz., assignors to The Garrett Corporation, Los Angeles, Calif., a corporation of California Filed July 30, 1959, Ser. No. 830,612

7 Claims. (Cl. 287—130)

This invention relates generally to coupling devices and in its more particular aspects is directed to means for mounting power plant accessories, such as generators or starters, on the support pads of engines.

One of the objects of this invention is to provide a coupling for securing an accessory to the support pad of an engine in a quick, easy manner by one individual workman without the use of special tools or other equipment.

Another object of the invention is to provide a quick disconnect coupling for mounting an accessory on an engine support pad, the coupling being composed of relatively few parts and simple to use.

Still another object of the invention is to provide a quick disconnect coupling for mounting an accessory on an engine support pad, the coupling having means by which the operator can place the accessory in place against the engine pad, revolve it a few degrees to secure a temporary fastening means, after which a locking means may be operated to prevent release of the fastening means, and the operator may then use both hands to apply clamping means to further secure the accessory in applied position and hold the locking means against accidental release.

A further object of the invention is to provide a quick disconnect coupling of the type set forth in the preceding paragraph with resilient means operative when the clamping means is removed to cause the locking means to assume an unlocked position when it is desired to remove the accessory from the engine support pad.

A still further object of the invention is to provide a quick disconnect coupling for mounting an accessory on an engine support pad, the coupling having a set of flange members which may be suitably secured to the support pad and accessory and providing the flange members with sets of interengaging elements, one set being rendered operative by partially rotating the accessory after placing the same in assembled relation to temporarily retain the accessory in position, and the other being engaged after the accessory has been partially rotated to prevent detaching rotation of the accessory. The coupling also includes a clamp ring which surrounds the flange members and urges them into assembled relationship when tightened, the clamp ring also holding the second set of interengaging elements in operative relation, thus preventing relative rotation of the flange members, which might lead to premature accidental release of the temporary retaining means when the clamp ring is detached.

With these and other objects in view, which will appear as the description proceeds, the invention consists in the novel features of construction and combination of elements more particularly set forth in the following description of one form of the invention shown in detail in the accompanying drawings.

In the drawings:

Fig. 1 is an exploded perspective view of a quick disconnect coupling formed in accordance with the present invention, the parts being shown in position ready to be assembled;

Fig. 2 is a front elevational view of a portion of one of the flange members forming a part of the coupling, this figure showing an opening formed in the flange;

Fig. 3 is a vertical sectional view taken through the lower portion of the coupling in assembled relationship; and Fig. 4 is a similar view showing the coupling with the clamp ring portion removed.

Referring more particularly to the drawings, the coupling forming the subject matter of the invention includes two flange members 10 and 11. One of these flange members 10 is provided for attachment to a support pad on an engine of any suitable type having a rotating element, such as a shaft (not shown). The flange member 10 may be suitably secured to the support pad by passing bolts or other fastening elements through openings formed in the flange member. Any suitable fastening means may be employed in place of the bolts.

The other flange member 11 may be formed with, or suitably secured to, the accessory 12, a portion of which is indicated on the drawing. This accessory is also provided with a shaft which may be provided with splines or keys 14 to form a driving connection with the rotating element of the engine. Splines are preferably provided, since they permit the accessory to be aligned with the driving element and moved longitudinally into driving engagement therewith. During this movement the faces of the flange members 10 ad 11 are brought into abutting relationship.

In the form of the invention illustrated, one of the flange members, namely, that provided on the accessory, is formed with a projecting pin 15, which is aligned with and received by a circular opening or recess 16 formed in the flange member 10. The rear face of the flange member 10 is further recessed, as at 17 to provide a rearwardly facing shoulder 18, this shoulder being provided for the purpose of engaging a rearwardly facing shoulder 20 formed by notching the pin 15 in spaced relation from the outer end thereof. After the accessory is aligned with the support pad and moved toward the engine to bring the surfaces of the flange members into abutting relationship and establish a driving connection between the rotating member of the engine and the shaft 14, the accessory may be partially rotated to position the shoulder 20 on the pin 15 in engagement with the shoulder 18. This interengagement of the shoulders will serve to temporarily retain the accessory in assembled relationship with the engine.

To prevent accidental rotation of the accessory, which would disengage the shoulders 18 and 20 and possibly release the accessory, the flanges are provided with a locking or second interengaging member which is disposed on the opposite side of the axis of the shaft 14 from the pin 15. This locking means comprises a supporting clevis 21 which is recessed in the flange member 10 and secured thereto by one or more screws 22. This clevis pivotally receives a latch member 23 which, when the flange members are in abutting relationship and the shoulders 18 and 20 are engaged, may be moved into a slot 24 formed in the flange member 11. When the latch is so positioned, relative rotation between the flange members 10 and 11 will be precluded.

A spring 25 surrounds the pivot for the latch and has one end disposed for engagement by the latch to move the latter element in an outward direction in the slot 24. The spring is so constructed that the latch will be moved out of the slot to release the accessory for turning movement.

It will be noted from Figs. 3 and 4 that the rear surfaces of the flange members adjacent the peripheries thereof are oppositely inclined, as at 26, to provide wedge surfaces for engagement by similarly arranged sides of a channel element 27 formed on a clamp ring 28. This clamp ring is of the split type, the end portions receiving a fastening element 30 used to draw the end portions together to secure the accessory in mounted position on the engine. The inclined surfaces 26 and 27 serve to urge the flange members toward one another when the ends of the clamp ring are drawn together. During the application of the clamp ring, the latch 23 is moved into the slot 24 against the force of spring 25 to the position shown in Fig. 3. It will be retained in this position as long as the clamp ring remains in place.

It will be noted that after the accessory is aligned with the support pad and revolved to engage the shoulders 18 and 20, and the latch 23 is moved into the slot 24, the operator may then release the accessory without danger of the device becoming detached from the engine. He may then use both hands to apply the clamp ring.

In removing the accessory for service or replacement, the ends of the clamp ring may be separated and the ring withdrawn. The spring 25 will then move the latch in an outward direction in the slot 24. The accessory may then be partially rotated to disengage the shoulders 18 and 20, after which the accessory may be moved axially to completely separate it from the engine.

While but a single form of the invention has been illustrated and described, it should be obvious that many minor changes may be made in the interengaging elements, such as the pin 15, recess 16, shoulders 18 and 20, and the latch 23 and slot 24, without departing from the spirit and scope of the invention. A single form of the invention has been disclosed. It should be obvious, however, that any suitable means which will permit the accessory to be temporarily retained in assembled relationship and locked therein, prior to the application of a permanent retaining means, may be provided, the permanent retaining means serving also to retain the locking means in operative condition.

We claim:

1. A quick disconnect coupling for mounting an accessory on an engine support pad comprising: a pair of flange members, one being provided for the accessory and the other for the support pad; an element projecting from one of said flange members, the other flange member being formed with a recess to receive said element when said flange members are disposed in axially aligned abutting relationship; interengaging means on said element and said other flange member for temporarily preventing separation of the flange members, said means being rendered operative by relative rotary movement of said flange members when said element is received by said recess; a second interengaging means on said flange members operative when the first interengaging means is in operation to prevent relative rotation of said flange members; and clamp ring means at least partially surrounding said flange members to urge the same toward one another, said clamp ring means also retaining said second interengaging means in operative relationship.

2. A quick disconnect coupling for mounting an accessory on an engine support pad comprising: a pair of flange members, one being provided for the accessory and the other for the support pad; an element projecting from one of said flange members at a point spaced laterally from the center thereof, the other flange member being formed with a recess to receive said element when said flange members are disposed in axially aligned abutting relationship; interengaging means on said element and said other flange member for temporarily preventing separation of the flange members, said means being rendered operative by relative rotary movement of said flange members when said element is received by said recess; a second interengaging means on said flange members adjacent the edges thereof on the opposite side of the center from said element, said second interengaging means being operative when the first interengaging means is in operative position to prevent relative rotation of said flange members; and clamp ring means extending around said flange members and urging the same toward one another, said clamp ring means also retaining said second interengaging means in operative relationship.

3. A quick disconnect coupling for mounting an accessory on an engine support pad comprising: first and second flange members fixed to the engine support pad and the accessory, respectively, the edge portions of said flange members being shaped to receive an encircling clamping ring; a projection eccentrically disposed on one of said flange members, said projection being formed with a rearwardly facing shoulder; a recess formed in the other flange member to receive said projection, the latter flange member having a shoulder for cooperative engagement with the shoulder on said projection upon relative rotation of said flanges following the reception of said projection by said recess; a movable latch on one of said flange members; a second recess in the other flange member, said recess being disposed to receive said latch following relative rotation of said flanges to engage said shoulders; and a clamp ring removably engaged with the edge portions of said flanges to retain them in assembled relationship, said clamp ring also holding said latch in said recess to prevent undesired relative rotation of said flange members.

4. A quick disconnect coupling for mounting an accessory on an engine support pad comprising: first and second flange members on the engine support pad and accessory, respectively, the edge portions of said flange members being formed with diverging outer surfaces; a pin projecting from an eccentrically disposed point on the second of said flange members, said pin being notched to provide a rearwardly facing shoulder; a recess formed in the first flange member to receive said pin when said flanges are in assembled abutting relationship, the first flange having a shoulder for cooperative engagement with the shoulder on said pin upon relative rotation of said flanges in abutting relationship; a pivoted latch adjacent the periphery of one of said flange members; a slot in the edge of the other flange member, said slot being disposed to receive said latch when the shoulder on said pin is in engagement with the shoulder on the second flange; spring means operative to move said latch outwardly in said slot; and a clamp ring with inclined surfaces to engage the diverging surfaces on said flanges and urge the latter toward one another, said clamp ring also retaining said latch in said recess to prevent undesired relative rotation of said flange members.

5. A quick disconnect coupling for mounting an accessory on an engine support pad comprising: first and second substantially circular flange members formed for attachment to the engine support pad and accessory, respectively, said flanges having oppositely inclined outer surfaces; a pin projecting from an eccentrically disposed point on the second of said flange members, said pin being notched to provide a rearwardly facing shoulder; an opening formed in the first flange member to receive said pin when the flange members are in assembled abutting relationship, the shoulder on said pin engaging said first flange member adjacent said opening upon relative rotation of said flange members to temporarily prevent separation thereof; a pivot support mounted on one of said flange members in substantially diametrically opposed relation from said pin; a latch pivotally connected with said support, said latch being formed for reception by a slot in the other flange member when the shoulder on said pin is in engagement with said first flange; spring means operative to move said latch outwardly in said slot; and a clamp ring with inclined surfaces engaging the inclined outer surfaces of said flange and urging the latter toward one another, said clamp ring also serving to retain said latch within the confines of said flange members to prevent undesired relative rotation thereof.

6. A quick disconnect coupling for mounting an accessory on an engine support pad comprising: a pair of flange members, one being provided for the accessory and the other for the support pad; an element projecting from one of said flange members, the other flange member being formed with a recess to receive said element when said flange members are disposed in axially aligned abutting relationship; interengaging means on said element and said other flange member for temporarily preventing separation of the flange members, said means being rendered operative by relative rotary movement of said flange members when said element is received by said recess; a clevis member mounted on one of said flange members substantially diametrically opposite said element; a latch member mounted for pivotal movement on said clevis member, the other flange member being provided with a recess to receive said latch when the interengaging means on said element and flange member are in operative position; and clamp ring means at least partially surrounding said flange members to urge the same toward one another, said clamp ring means also retaining said latch member in the recess in the flange.

7. A quick disconnect coupling for mounting an accessory on an engine support pad comprising: a pair of flange members, one being provided for the accessory and the other for the support pad; an element projecting from one of said flange members, the other flange member being formed with a recess to receive said element when said flange members are disposed in axially aligned abutting relationship; interengaging means on said element and said other flange member for temporarily preventing separation of the flange members, said means being rendered operative by relative rotary movement of said flange members when said element is received by said recess; a clevis member mounted on one of said flange members substantially diametrically opposite said element; a latch member mounted for pivotal movement on said clevis member, the other flange member being provided with a recess to receive said latch when the interengaging means on said element and flange member are in operative position; spring means adjacent said latch member and tending to move the same out of said recess; and clamp ring means at least partially surrounding said flange members to urge the same toward one another, said clamp ring means also retaining said latch member in the recess in opposition to said spring.

References Cited in the file of this patent

UNITED STATES PATENTS

| | | |
|---|---|---|
| 752,620 | Hardy | Feb. 16, 1904 |
| 870,696 | Stetler | Nov. 12, 1907 |
| 877,113 | Owens | Jan. 21, 1908 |
| 1,055,922 | Landaal | Mar. 11, 1913 |
| 2,303,032 | Dusevoir | Nov. 24, 1942 |
| 2,471,190 | Bartelson | May 24, 1949 |
| 2,693,380 | Flanagan | Nov. 2, 1954 |
| 2,891,393 | Swanson | June 23, 1959 |

FOREIGN PATENTS

| | | |
|---|---|---|
| 5,084 | Great Britain | Oct. 25, 1883 |